W. H. JOHNSON.
STEERING BALANCE.
APPLICATION FILED NOV. 26, 1919.

1,346,211.

Patented July 13, 1920.

Inventor
W. H. Johnson
By
Attorney

UNITED STATES PATENT OFFICE.

WILLIAM H. JOHNSON, OF PERRY, OKLAHOMA.

STEERING-BALANCE.

1,346,211.   Specification of Letters Patent.   Patented July 13, 1920.

Application filed November 26, 1919. Serial No. 340,758.

*To all whom it may concern:*

Be it known that I, WILLIAM H. JOHNSON, a citizen of the United States, residing at Perry, in the county of Noble, State of Oklahoma, have invented certain new and useful Improvements in Steering-Balances; and I do hereby declare the following to be a full, clear, and exact description of the invention, such as will enable others skilled in the art to which it appertains to make and use the same.

This invention relates to steering apparatus and more particularly to attachments therefor, and has especial reference to balancing attachments for steering apparatus tending to hold the pilot wheels of a motor vehicle in a predetermined position against the influence of obstructions upon the surface over which the wheels may be traveling but yielding to the action of the steering wheel or lever.

The object of the invention is to provide a device of this kind which may be attached to automobiles already in use; which will be complete in itself and which may be placed in position with the expenditure of a minimum of time and labor, resulting in an attachment which may be sold as an integral article and which may be applied to an automobile by one relatively unfamiliar with mechanical practice.

Other objects and advantages will be apparent from the following description.

Figure 1:
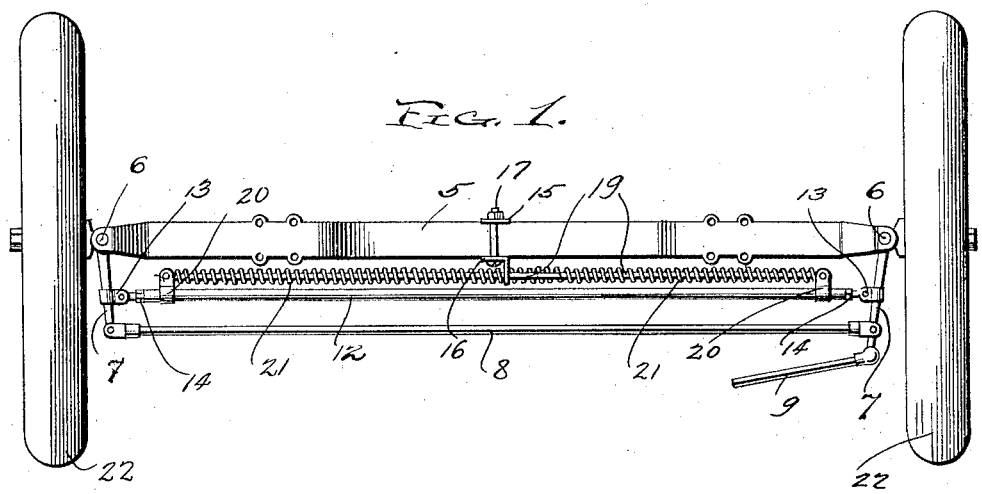
Figure 1 shows in plan the front axle of an automobile, its wheels and steering knuckles, the usual tie rod and the link, and my invention applied.
Figure 2:
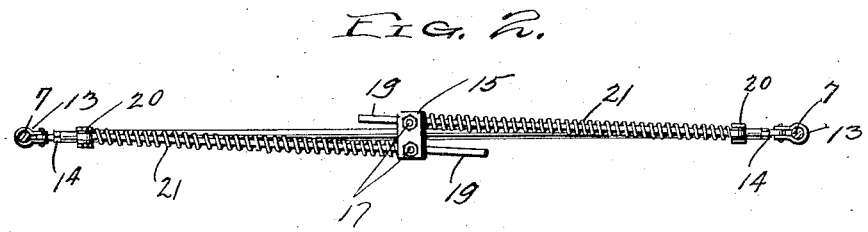
Fig. 2 is a rear elevation of the device, the axle being omitted.
Figure 3:
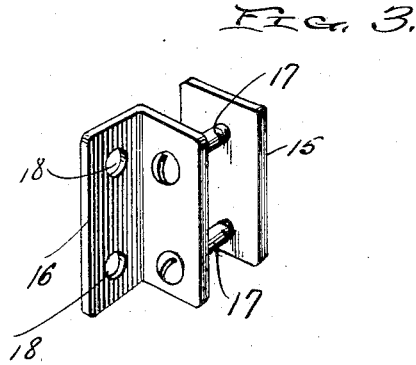
Fig. 3 is a perspective view of the guide bracket.

Referring now to the drawings, the front axle of an automobile is shown at 5, and to the ends of this axle there are pivoted at 6 the usual knuckles having the rearwardly extending arms 7 to which the tie rod 8 is pivoted at its ends. Connected pivotally with the tie rod is the usual link 9 which is adapted to be connected with a steering wheel, which of necessity must be adjustable in length so that it can be applied to machines wherein said arms 7 are variously spaced from each other, for which purpose the rod has eye-bolts adjustably mounted in its extremities and locked by nuts 14; and the eyes thereof are pivoted in clips 13 which are to be secured tightly to the arms 7. The attachment also includes a guide bracket for application to the midlength of the front axle, and as shown herein this bracket includes a clip plate 15, an angle plate 16, and a pair of fastening bolts 17 engaged through the plates above and below the axle.

The outstanding leaf of the angle plate has the pair of openings 18 therein. Secured on the end portions of the rod 12 are the clips 20, to which are pivoted the outer ends of the guide rods 19. The rods 19 extend diagonally from the clips 20 toward the center of the axle, lap each other and project respectively through the openings 18. Encircling each of the rods 19 between the clip 20 and the outstanding leaf of the angle plate 16 is a helical spring 21 serving to resist longitudinal movement of the corresponding rod 19 inward through the angle plate.

As shown especially in Fig. 1, the structure is thus such that when the ground wheels 22 of the vehicle are turned through the medium of the steering wheel, the rod 12 will be shifted longitudinally of the axle 5. Such movement of the ground wheels in one direction will cause one of the rods 19 to move through the corresponding opening 18 against the action of the corresponding spring 21, the leverage from the steering wheel to the arms 7 being such as to overcome the resistance of the spring.

If the steering wheel be released, however, the action of the spring will be to turn the parts to such position that the ground wheels of the vehicle will track straight, longitudinally of the vehicle which is of course their normal position.

While the springs 21 yield to the movement of the parts through the medium of the steering wheel, they have sufficient strength to resist movement of the parts through energy applied to the ground wheel.

By reason of the adjustable clips 20, the rods 19 may be shifted longitudinally on the rod 12 so as to vary the tension upon the springs 21.

What is claimed is:

A steering balance for motor vehicles comprising a guide bracket for attachment to the mid-length of the front axle and having an outstanding leaf with upper and lower openings, a pair of clips for attachment to the arms of the steering knuckles, a rod pivotally connecting said clips, means for adjusting the length of this rod to adapt it to the motor vehicle, clips mounted on the rod near its ends, rods pivoted in these clips and projecting inward and lapping each other, their inner ends being mounted through respective holes in said leaf, and expansive springs coiled on these rods between said leaf and the last-named clips.

In testimony whereof I affix my signature in the presence of two witnesses.

WILLIAM H. JOHNSON.

Witnesses:
JESSE P. TREADWAY,
M. E. TUCKER.